July 12, 1966  S. B. JONES  3,260,151
CLAMPING DEVICE
Filed April 8, 1964
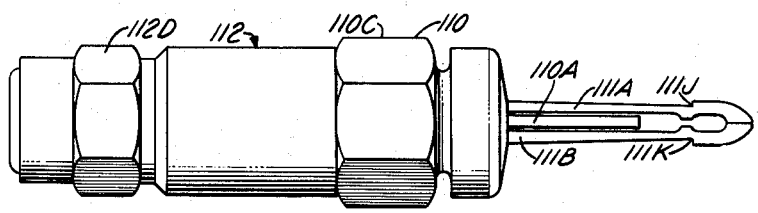
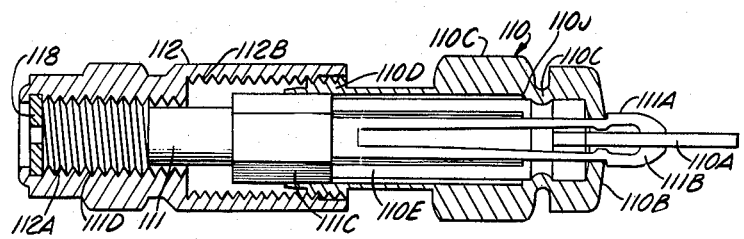
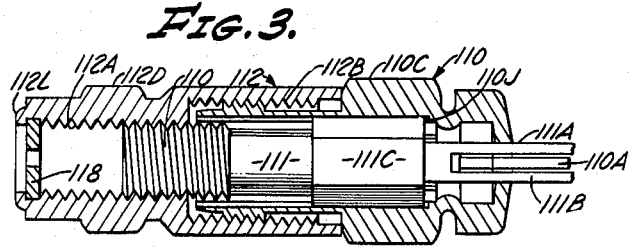
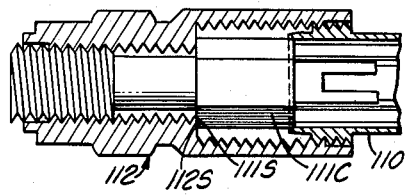
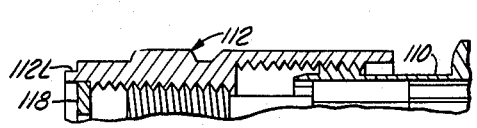
INVENTOR.
STERLING B. JONES

United States Patent Office 3,260,151
Patented July 12, 1966

3,260,151
CLAMPING DEVICE
Sterling B. Jones, Torrance, Calif., assignor to Monogram Industries, Inc., Hawthorne, Calif., a corporation of California
Filed Apr. 8, 1964, Ser. No. 358,234
2 Claims. (Cl. 85—81)

The present invention relates generally to fastening means and more specifically to a fastener for temporarily securing sheet metal together as, for example, in the process of riveting skin sections on aircraft.

A fastener of the character described herein using a combination of right- and left-hand screw threads is disclosed in my pending application Serial No. 184,272, filed April 2, 1962, and assigned to the same assignee, and the present application is a continuation-in-part of said application Serial No. 184,272.

The fastener described herein involves essentially three screw-threaded elements involving right- and left-hand screw threads, i.e. screw threads which may be termed as being of different hands or of different directions, for easy and quick attachment to and from the metal sheets temporarily fastened or clamped by the fastener. These three elements are generally a sleeve member, a screw member and a nut member. The sleeve member mounts a spreader which cooperates with a pair of cantilever needle members on the screw member to spread the same and such sleeve member is fabricated with (a) a thread cooperating with a like thread on the nut member; (b) internal lands cooperating with flat portions of the screw member for preventing relative rotation; and (c) an external hexagonal portion useful in preventing turning when the fastener is being used. The screw member carries the above-mentioned needles, has the previously mentioned flat portions and is also provided with threads engaging a like threaded portion of the nut member. The nut member is provided with two threaded portions of opposite hands, i.e. a right-hand and a left-hand screw-threaded portion engageable with like threads on the screw and on the sleeve, and is also provided with convenient means for turning of the same to effect quick and easy fastening to and release from sheets that are to be fastened.

It is accordingly a general object of the present invention to provide an improved fastener of this character.

Another object of the present invention is to provide a fastener of this character which accomplishes its task in a fast and simple manner.

Another object of the present invention is to provide an improved fastener of this character which is essentially foolproof in its operation, rugged, and capable of many repeated fastening operations.

Another object of the present invention is to provide an improved fastener of this character which may be used with a simple power tool.

Another object of the present invention is to provide an improved fastener of this character which facilitates operations and indeed eliminates operations required in the use of prior art fasteners.

Another object of the present invention is to provide an improved fastener that incorporates features that result in quick and inexpensive mass production.

Another object of the present invention is to provide a clamp of this character particularly useful for power tool application.

Another object of the present invention is to provide a clamp of this character which requires only approximately one fourth as many turns of its take-up nut member to effect a tightening or release compared to a standard type of clamping arrangement commercially used, this feature resulting in approximately 75% less actual driving time required for the application or extraction of each clamp.

Another object of the present invention is to provide a clamp of this character in which the nut member does not free spin when it reaches the extent of its travel during the clamp extraction cycle, but such nut member cooperating with other clamping structure is used to brake an air motor to a complete stop, this feature also resulting in a clamp that is thereby permitted to automatically lock within the barrel of the application power tool without the extra operation of manipulating buttons or levers on the power application tool.

An important feature of the present construction is that unlike standard commercial clamping structures now presently used, in which such prior art clamping structure often remains firmly fixed in the work after a take-up nut has been completely run back during the extraction cycle and in which the only way to release the prior art clamp is to hammer the take-up shaft forward until the gripping needles are extended out into the relaxed position, with this procedure often resulting in damage to both the clamp and the work, the present clamp embodies very important structural features whereby the holding needles are automatically extended to the relaxed position when and as the take-up nut member is run back thereby permitting this nut clamp to be extracted from the work without effort and more important, without damage to the work or the clamp.

Another object of the present invention is to provide an improved clamping structure of this character in which when tightened in the work, the body portion of the same protrudes approximately 1¼ inches less from the work surface than, for example, a standard commercial clamp now being used, this feature being important in that there is less chance of a worker catching his clothes or person on the clamp as he moves past an air-frame assembly on a narrow or crowded catwalk. This feature is an important safety factor, not only for the workers but also for the quality of the assembly since the further the clamp protrudes from the work the greater the leverage which may be applied against it when accidentally bumped or struck from the side.

It is therefore another object of the present invention to provide a clamping structure of this character which allows faster performance and with greater safety.

Another object of the present invention is to provide a clamping structure of this character which is particularly adaptable for application and extraction by a power tool but which also may be applied and retracted using conventional wrenches.

Another object of the present invention is to provide a clamping structure of this character which is uniquely adapted for applying and extraction with a power driven tool and in which the clamping structure may be extracted from the work by slipping a barrel of such tool over the clamping structure, applying power to the tool and effecting a discontinuance of power application after the tool has been moved away from the work with the clamping structure therein. In such operation it will be found that this procedure results in the clamping structure remaining in the tool barrel for fast effortless extraction of the clamp without wasted motion, and that when the power is released and the tool is clear of the work, the clamping structure drops freely out of the tool barrel completing an extraction operation on which the worker is not required to struggle with clamps frozen in the work, i.e. the present construction completely eliminates the usual problem where a clamping structure has to be hammered loose from the work even after the nut member thereof has been completely run back.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

FIG. 1 is a side elevational view of a preferred fastener embodying features of the present invention.

FIGS. 2 and 3 are longitudinal sectional views of the fastener in its retracted and extended positions respectively.

FIGS. 4 and 5 illustrate relationship of parts of the fastener during its assembly.

Considering the details of construction of the sleeve member 110, it is seen that the same has a nose portion 110B crimped or swaged as described above, to secure and retain the spreader 110A. Also, the sleeve member 110 is formed with an external enlarged hexagonal portion 110C of larger size than the externally threaded portion 110D, and internally of sleeve member 110 there is formed a plurality of flats in the form of an internal hexagon 110E which provides lands on which a like external hexagon portion 111C of the screw member 111 may slide longitudinally without substantial turning of the screw member 111 within sleeve member 110.

The screw member 111 has integrally formed or joined therewith the previously mentioned and conventional shouldered needle members 111A and 111B, the previously mentioned outer hexagonal portion 111C and an externally right-hand threaded portion 111D engageable in mating fashion with a like internally threaded portion 112A of nut member 112.

The nut member 112 has the previously mentioned internally right-hand threaded portion 112A, the internally left-hand threaded portion 112B, and the external hexagonal portion 112D useful when a fastening tool is used, as described above.

In operation of the fastener, the needle members 111A and 111B in their fully extended positions, as shown in FIGS. 1 and 3, are threaded through aligned apertured portions of the sheet metal elements which are to be fastened, after which the sleeve member 110 is maintained stationary while the nut member 112 is turned to thereby produce withdrawal of the needle members 111A and 111B to positions where the external shouldered portions 111J, 111K thereof serve to clamp or fasten the sheets against the nose portion 110B. During such retraction of the needle members 111A, 111B, the spreader 110A engages the cam-shaped internal shouldered portions of the needle members to spread or deflect the same outwardly to achieve the above-mentioned clamping.

During this retraction and outward deflection of the needle members 111A, 111B, they move longitudinally without turning because of the engagement of the flat portions 111C on screw member 111 with cooperating internal hexagonal land surfaces 110E on sleeve member 110. In other words, the screw member 111 is not turned, the same being permitted to move longitudinally only within sleeve member 110.

It will be seen that the fastener may be released by turning the nut member 112 in the opposite direction where again the condition illustrated in FIGS. 1 and 3 is achieved.

It will also be seen that the elements of the fastener always stay assembled since permissive movement is limited on the one hand (in the extended condition of needle members 111A, 111B) by engagement of the nut 112 with the adjacent shoulder portion 110C of sleeve member 110 as seen in FIGS. 1 and 3 and, on the other hand, as seen in FIG. 2 by engagement of the end of screw member 111 with a washer 118 retained in a grooved portion of nut member 112 as a result of swaging a lip portion of member 112. Alternately, if desired, the right-hand end of the hexagonal screw member portion 111C may cooperate with an internal sleeve shouldered portion 110J to limit the extended movement of the needle elements 111A, 111B.

It will be seen from the foregoing constructions that the fastening and unfastening operations are facilitated thereby. It is noted in particular that the T-shaped spreader 110A powers the needle members 111A and 111B outwardly during the fastening operation, and in the unfastening operation the T-shaped spreader is disengaged from the clamping elements 111A, 111B to permit quick and easy removal of the entire clamping device, as described above.

The assembly procedure is now described in connection with FIGS. 4 and 5 which illustrate progress steps in such assembly. Prior to swaging the lip that retains washer 118 (FIG. 2) and prior to swaging the nose piece 110B to form the spreader retaining bead 110C (FIG. 5). the screw member 111 is threaded into the nut member 112 until, as shown in FIG. 4, the left-hand shouldered portion 111S of hexagonal portion 111C abuts the internal nut shouldered portion 112S thereby locating these two elements, and in this condition shown in FIG. 4 it will be seen that the threaded end portion of the screw member protrudes slightly beyond the left-hand end of the nut member. After these elements 111, 112 are so positioned, the spreader element 110A, a flat T-shaped member, is sandwiched between the needle members 111A, 111B, and the sleeve member 110 is then threaded into the nut member in which case the sleeve member 110 is rotated not only with respect to the nut member, but also with respect to the screw member until there is slight engagement between the sleeve member and nut member threads, and the internal lands of the sleeve member 110 are aligned with the flats on the nut member hexagonal portion 111C. After this is accomplished, the nut member 112 is rotated to its relative position shown, for example, in FIG. 5 where one is then permitted to insert the washer 118 against an internal shouldered portion of the nut member 112 and inside of the outwardly extending non-deformed lip portion 112L. Then the lip portion 112L may be swaged around the washer 118 to retain it, as shown in FIG. 3. However, since two swaging operations including this swaging operation on lip 112L and the swaging operation forming the spreader retaining bead 110C are to be performed, it is preferred that both be accomplished substantially simultaneously, and for that purpose after the washer 118 is inserted, as shown in FIG. 5, the assembly may then, for example, be supported on a suitable anvil with the nose portion 110B resting on the anvil and with the longitudinal axis of the assembly extending vertically. When so positioned, swaging forces may be applied to the lip 112L which are large enough not only to produce the desired deformation of lip 112L, but to also substantially simultaneously deform the reduced cross-secional area portion of the sleeve nose 110B to form the spreader retaining bead portion 110C. While the above operations have been described in connection with an anvil, it is noted that the same result is achieved when the assembly is positioned in a press which serves to apply a compression force between, on the one hand, the lip 112L and, on the other hand, the nose portion 110B.

While a particular embodiment of the present invention has been shown and described, it will be obvious to those skilled in the art that changes and modifications may be made without departing from this invention in its broader aspects and, therefore the aim in the appended claims is to cover all such changes and modifications as fall within the true spirit and scope of this invention.

I claim:

1. A fastener of the character described comprising a sleeve member, a screw, a nut member, said screw and nut member cooperating as a unit for axial movement relative to said sleeve, said sleeve member fixedly carrying a spreader element at one end thereof, said screw carrying a pair of deflectable needles, said spreader being positioned between said needles and cooperating therewith to deflect and spread said needles outwardly from said spreader, said nut member having threads of one hand engaging a threaded portion of said sleeve member and having a second set of threads of the hand opposite to said one hand engaging a threaded portion of said screw member, said sleeve member slidably receiving said screw with means cooperating between said screw and said sleeve member preventing relative rotation therebetween, said screw having a greater number of its threads engaged by said nut member in a first condition when said needles are spread by said spreader element than are engaged by said nut member in a second condition when the ends of the needles are positioned furthermost from said spreader, one of said members being hollow to permit axial movement of the other of said members therein, a stop member rigidly secured to said one member adjacent the end thereof remote from said needles and extending radially inwardly thereof for engagement with a radially enlarged means on a portion of said unit to limit the axial movement thereof, the axial distance traveled by said radially enlarged means as the needle members are moved from said furthermost position to said spread position being less than the axial extent of the threaded engagement between the nut and sleeve members during said movement to prevent accidental disengagement of the parts of the fastener.

2. A fastener according to claim 1 wherein the stop member is secured to the nut member and extends radially inwardly thereof for engagement with the threaded portion of the screw.

References Cited by the Examiner
UNITED STATES PATENTS 3,144,805   8/1964   Lee _____ 85—81

CARL W. TOMLIN, *Primary Examiner.*

EDWARD C. ALLEN, *Examiner.*

R. S. BRITTS, *Assistant Examiner.*